Oct. 4, 1938.    E. W. SMITH    2,131,762
GASKET, PACKING, AND THE LIKE
Filed Jan. 18, 1935

INVENTOR
EDWARD W. SMITH
BY  *Ezekiel Wolf*
ATTORNEY

Patented Oct. 4, 1938

2,131,762

UNITED STATES PATENT OFFICE 2,131,762

GASKET, PACKING, AND THE LIKE

Edward W. Smith, Melrose, Mass., assignor to Submarine Signal Company, Boston, Mass., a corporation of Maine Application January 18, 1935, Serial No. 2,393

11 Claims. (Cl. 181—0.5)

The present invention relates to gaskets, packings, bearings and the like employed in contact with stainless steel in the presence of an ionized medium.

The present invention has particular application to gaskets for submarine sound producers having stainless-steel diaphragms or mounting flanges, cutless bearings for stainless-steel propeller shafts and packings for sea water pumps having stainless-steel shafts.

In many devices, for example, in submarine sound producers, it has been found advantageous to employ a stainless steel for the metallic surface which is in contact with sea water. In nearly all of these cases it is necessary to make a watertight joint between the stainless-steel member and some other member which may be of the same or a different metal. Heretofore such joints have been made with the aid of a rubber gasket or packing. Such a gasket or packing has proved satisfactory with substantially all materials with which it has been used. It has been found, however, that where a stainless-steel surface is in contact with the rubber gasket and with sea water a serious corrosion of the stainless steel takes place which soon renders the device inoperative. For example, in submarine sound producers having a stainless-steel diaphragm mounted in contact with the sea water through a hole in the skin of a ship by means of a flange gripped between clamping members with the intervention of a rubber gasket, a serious corrosion of the flange was found to take place. Likewise, an attempt to use the so-called cutless bearing for stainless-steel propeller shafts resulted in such bad corrosion of the shaft as to make the arrangement inoperative.

According to the present invention gaskets, packings and bearings in contact with stainless-steel surfaces in the presence of an ionized medium, such as sea water, are made of sulphur-free rubber.

Figure 1:
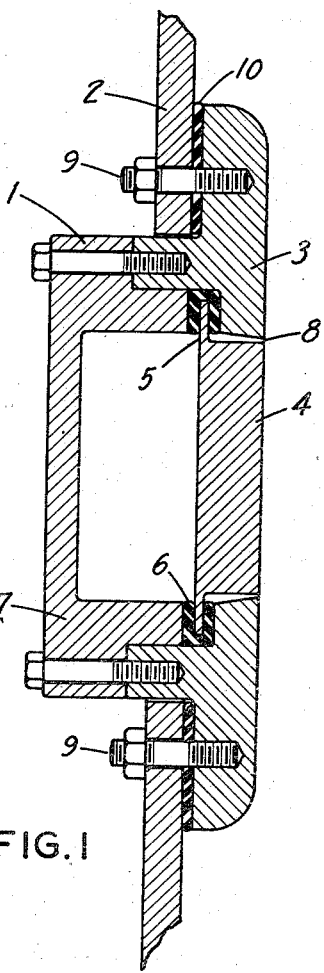
Figure 2:
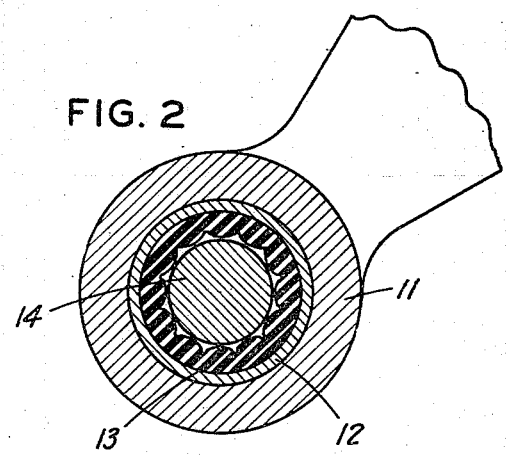

Examples of the use of sulphur-free rubber gaskets and the like are shown in the accompanying drawing in which Figure 1 represents a skin-mounted submarine sound sending or receiving device; Figure 2 shows a section of a bearing for a stainless-steel shaft such as a propeller shaft; and Figure 3 is a cross section of a packing applied to a stainless-steel shaft.

As shown in Figure 1 a submarine sound sender or receiver 1 is mounted in an opening in the hull 2 of a vessel. The signaling device 1 comprises a flanged member 3 having an aperture in which is mounted a sound transmitting or receiving diaphragm 4 made of stainless steel. The diaphragm is provided with a thin flange or web 5 made integral with the body of the diaphragm and supported in a sulphur-free rubber gasket 6 which is clamped tightly against the flanged member 3 by means of a member 7 which together with the member 3 and the diaphragm 4 forms a housing for the mechanism which vibrates or is vibrated by the diaphragm. The diaphragm-operating mechanism is not shown in the drawing since it forms no part of the present invention, and any suitable arrangement may be used. It will be noted that in this construction there is a space 8 between the diaphragm and the member 3 in which sea water may penetrate. However, if sulphur-free rubber is used for the gasket 6 in accordance with the present invention, no corrosion of the thin web 5 will take place. The signalling device as formed by the members 3, 4 and 7 is fastened by means of bolts 9, as shown, to the hull of the ship. In some cases it is desired to use a rubber gasket between the flanged member 3 and the hull 2. If the member 3 is made of stainless steel, the gasket 10 between the flange of member 3 in the hull 2 should be made of sulphur-free rubber.

In Figure 2 there is shown schematically a section through a so-called cutless bearing. In a supporting frame 11 there is mounted a bronze ring 12 to which is vulcanized a sulphur-free rubber ring 13 having its internal surface corrugated, the convex portions of which form the bearing surface for a stainless-steel propeller shaft 14. Foreign matter which finds its way into the bearing is worked into the grooves and washed out without causing serious damage to the shaft. Such bearings have heretofore been known in the art but they have been made of ordinary rubber containing sulphur and a consequent corrosion of the stainless-steel shaft was found to take place. According to my invention the bearing is made of sulphur-free rubber whereby the corrosion is prevented.

Figure 3:
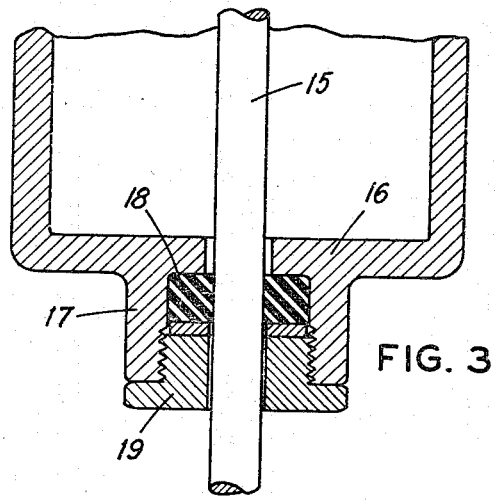

In Figure 3 a watertight packing for a rotating shaft is shown. The stainless-steel shaft 15, which may be the shaft of a centrifugal sea-water pump, enters a sea-water containing chamber formed by the housing 16 through a packing gland formed in part by a cylindrical flange 17. Closely surrounding the shaft 15 and within the cylinder 17 a sulphur-free rubber ring 18 is pressed by means of the threaded compression member 19.

A similar construction may be used where the pump has a reciprocating piston in which case 15 would represent the stainless-steel piston rod operating in the stainless-steel cylinder 16.

I have found that while corrosion always takes place when a stainless-steel surface is in contact with ordinary rubber in the presence of an ionized medium such as sea water, such corrosion is wholly absent if sulphur-free rubber is employed in place of the ordinary rubber. While I do not know definitely the action which brings about the corrosion of the stainless steel, and do not wish to be limited by any particular theory of the cause of the corrosion, it is possible that the corrosion is produced in the following manner:

It is believed that the corrosion-resistant property of so-called stainless steel, which is a steel alloy containing chromium in amounts of the order of 15%, is due to the presence on the surface of the alloy of a tenaciously adhering film a few molecules in thickness of a metallic oxide, probably chromium oxide. Such a film can, of course, be destroyed by a strong reducing agent, but under ordinary conditions the film is replaced by oxidation of further chromium before any observable damage to the steel takes place. As is well known, sulphur is a strong reducing agent and it appears that the form in which it is present in ordinary vulcanized rubber is such as to make it available as a reducing agent.

It is possible, therefore, that the sulphur in a rubber gasket may attack the metallic-oxide film and rupture the same. Thereupon the combination of an ionized medium, such as sea water and possible acids resulting from the oxidation of the sulphur, can proceed unhindered through the ruptured oxide film to corrode the steel itself.

The above theory may or may not be correct, but corrosion of a stainless-steel surface in contact with a gasket in the presence of an ionized medium may be prevented by making the gasket out of sulphur-free rubber.

It is to be understood that instead of sulphur-free natural rubber a sulphur-free synthetic rubber may be used with good results, for example, the rubber-like compound known by the trade name "Duprene".

Having now described my invention, I claim:

1. In combination, a gasket or the like in proximity to a stainless steel surface adapted to be exposed to an ionized liquid medium, said gasket being composed of a sulphur-free rubber-like compound.

2. In combination, a gasket adapted to be inserted in a partition one side of which has a stainless steel surface is in contact with an ionized liquid medium characterized by the fact that said gasket is composed of sulphur-free rubber.

3. The combination of a gasket and means for clamping the same between two members one of which is made of stainless steel adapted to have a portion thereof exposed to an ionized liquid medium, said gasket being composed of sulphur-free rubber.

4. The combination of a submarine signaling device adapted to be mounted in an aperture in the hull of a ship in contact with the sea-water and having a stainless steel surface exposed to the water, and means for making the joint between said device and the ship's hull watertight including a gasket of sulphur-free rubber.

5. In a submarine sound sender and receiver a stainless steel diaphragm adapted to be mounted in contact with sea-water and means for supporting said diaphragm including a gasket made of sulphur-free rubber.

6. The combination of a stainless steel shaft and a watertight bearing therefor composed of sulphur-free rubber.

7. A bearing for a stainless steel propeller shaft composed of sulphur-free rubber.

8. A pump for an ionized liquid having a piston operable in a cylinder, at least one of said parts being made of stainless steel and a watertight packing for said piston rod composed of sulphur-free rubber.

9. A packing for a sea-water pump having stainless steel exposed to the sea water, the packing being composed of sulphur-free rubber.

10. In combination, a body adapted to have contact with an ionized liquid medium and having a stainless steel surface exposed to the liquid and cooperating therewith a sulphur-free rubber element mounted in proximity to said surface and having a portion also exposed to said medium.

11. In combination, a body adapted to have contact with an ionized liquid medium and having a stainless steel surface exposed to the liquid and means forming a liquid-tight joint with said body including a sulphur-free rubber element a portion of which also is exposed to said medium.

EDWARD W. SMITH.